US009100669B2

(12) United States Patent
Feng et al.

(10) Patent No.: US 9,100,669 B2
(45) Date of Patent: Aug. 4, 2015

(54) METHOD AND APPARATUS FOR ASSOCIATING MICRO-BLOGS WITH MEDIA PROGRAMS

(75) Inventors: Junlan Feng, Basking Ridge, NJ (US); Luciano De Andrade Barbosa, Madison, NJ (US); Hisao Chang, Cedar Park, TX (US); Ovidiu Dan, Bethlehem, PA (US); Bernard S. Renger, New Providence, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 241 days.

(21) Appl. No.: 13/105,953

(22) Filed: May 12, 2011

(65) Prior Publication Data

US 2012/0291070 A1 Nov. 15, 2012

(51) Int. Cl.
*G06F 3/00* (2006.01)
*G06F 13/00* (2006.01)
*H04N 5/445* (2011.01)
*H04N 21/2343* (2011.01)
*H04N 21/24* (2011.01)
*H04N 21/25* (2011.01)
*H04N 21/258* (2011.01)
*H04N 21/2665* (2011.01)
*H04N 21/422* (2011.01)
*H04N 21/472* (2011.01)
*H04N 21/4788* (2011.01)
*H04N 21/488* (2011.01)
*H04N 21/84* (2011.01)

(52) U.S. Cl.
CPC ... *H04N 21/234336* (2013.01); *H04N 21/2408* (2013.01); *H04N 21/251* (2013.01); *H04N 21/25866* (2013.01); *H04N 21/2665* (2013.01); *H04N 21/42203* (2013.01); *H04N 21/4788* (2013.01); *H04N 21/47202* (2013.01); *H04N 21/488* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 7,519,658 B1 | 4/2009 | Anglin | |
| 2004/0083490 A1* | 4/2004 | Hane | 725/46 |
| 2010/0064307 A1 | 3/2010 | Malhotra | |
| 2010/0100537 A1* | 4/2010 | Druzgalski et al. | 707/713 |
| 2010/0205541 A1 | 8/2010 | Rapaport | |
| 2010/0287587 A1* | 11/2010 | Patten et al. | 725/39 |
| 2010/0312769 A1* | 12/2010 | Bailey et al. | 707/740 |
| 2011/0055270 A1 | 3/2011 | Firminger | |

(Continued)

OTHER PUBLICATIONS

"Solr", http://lucene.apache.org/solr/, May 3, 2011.

(Continued)

*Primary Examiner* — Oschta Montoya
(74) *Attorney, Agent, or Firm* — Guntin & Gust, PLC; Ralph Trementozzi

(57) ABSTRACT

A system that incorporates teachings of the present disclosure may operate, for example, according to a method for identifying subsets of blogs from a collection of blogs according to a relevance of each subset of blogs to one of a plurality of media programs deliverable to a plurality of subscriber devices, determining for each subset of blogs one or more trends, detecting a subscriber device from the plurality of subscriber devices, selecting a media program from the plurality of media programs, selecting one of the subsets of blogs that is relevant to the media program, and supplying the subscriber device the selected subset of blogs with the one or more trends determined for the select subset of blogs. Other embodiments are disclosed.

15 Claims, 9 Drawing Sheets

(56) References Cited

U.S. PATENT DOCUMENTS

| | | |
|---|---|---|
| 2011/0055723 A1 | 3/2011 | Lightstone |
| 2011/0154208 A1* | 6/2011 | Horii .............................. 715/736 |
| 2012/0017239 A1* | 1/2012 | Ryu et al. ........................ 725/32 |
| 2012/0042334 A1* | 2/2012 | Choi et al. ...................... 725/32 |
| 2012/0096501 A1* | 4/2012 | Rodrigues et al. ............ 725/105 |
| 2012/0124625 A1* | 5/2012 | Foote et al. ..................... 725/42 |
| 2012/0144424 A1* | 6/2012 | Ganesan et al. ................ 725/40 |
| 2012/0144426 A1* | 6/2012 | Han et al. ........................ 725/44 |
| 2012/0167125 A1* | 6/2012 | Grubb ............................. 725/14 |
| 2012/0167137 A1* | 6/2012 | Wong et al. ..................... 725/38 |
| 2012/0174157 A1* | 7/2012 | Stinson et al. .................. 725/40 |
| 2012/0192227 A1* | 7/2012 | Fleischman et al. ........... 725/34 |
| 2012/0210383 A1* | 8/2012 | Sayers et al. .................. 725/116 |

OTHER PUBLICATIONS

Wikipedia, "Amazon Mechanical Turk", http://en.wikipedia.org/wiki/Amazon_Mechanical_Turk, May 3, 2011.

* cited by examiner

900

METHOD AND APPARATUS FOR ASSOCIATING MICRO-BLOGS WITH MEDIA PROGRAMS

FIELD OF THE DISCLOSURE

The present disclosure relates generally to a method and apparatus for associating micro-blogs with media programs.

BACKGROUND

Online social networks such as Facebook™, Twitter™, MySpace™ and LinkedIn™ have gained substantial popularity in recent years. Some analysts believe that social networks or blog sites are visited by three quarters of global consumers who go online.

DETAILED DESCRIPTION

The present disclosure describes, among other things, illustrative embodiments for associating micro-blogs with media programs and deriving trends therefrom. Other embodiments are contemplated by the present disclosure.

One embodiment of the present disclosure includes a device that has a memory coupled to a processor. The processor can be operable to receive a collection of micro-blogs, and identify subsets of micro-blogs from the collection of micro-blogs, where each subset of micro-blogs is identified according to a relevance of the subset to one of a plurality of television programs deliverable to a plurality of set-top boxes. The processor can be further operable to determine for each subset of micro-blogs one or more trends, detect a set-top box from the plurality of set-top boxes requesting a television program from the plurality of television programs, and supply to the set-top box a selection of one of the subsets of micro-blogs identified as relevant to the requested television program for concurrent presentation of the requested television program and a graphical user interface that presents at least a portion of the selected subset of micro-blogs and one or more trends associated therewith.

One embodiment of the present disclosure includes a media processor that has a memory coupled to a processor. The processor can be operable to receive a selection to present a media program, and receive from a device at least one of a subset of micro-blogs and one or more trends associated with the subset of micro-blogs. The subset of micro-blogs can be selected by the device from a collection of micro-blogs according to a relevance of the subset of micro-blogs to the selected media program.

One embodiment of the present disclosure includes a method for identifying subsets of blogs from a collection of blogs according to a relevance of each subset of blogs to one of a plurality of media programs deliverable to a plurality of subscriber devices, determining for each subset of blogs one or more trends, detecting a subscriber device from the plurality of subscriber devices selecting a media program from the plurality of media programs, selecting one of the subsets of blogs that is relevant to the media program, and supplying the subscriber device the selected subset of blogs with the one or more trends determined for the select subset of blogs.

Figure 1:
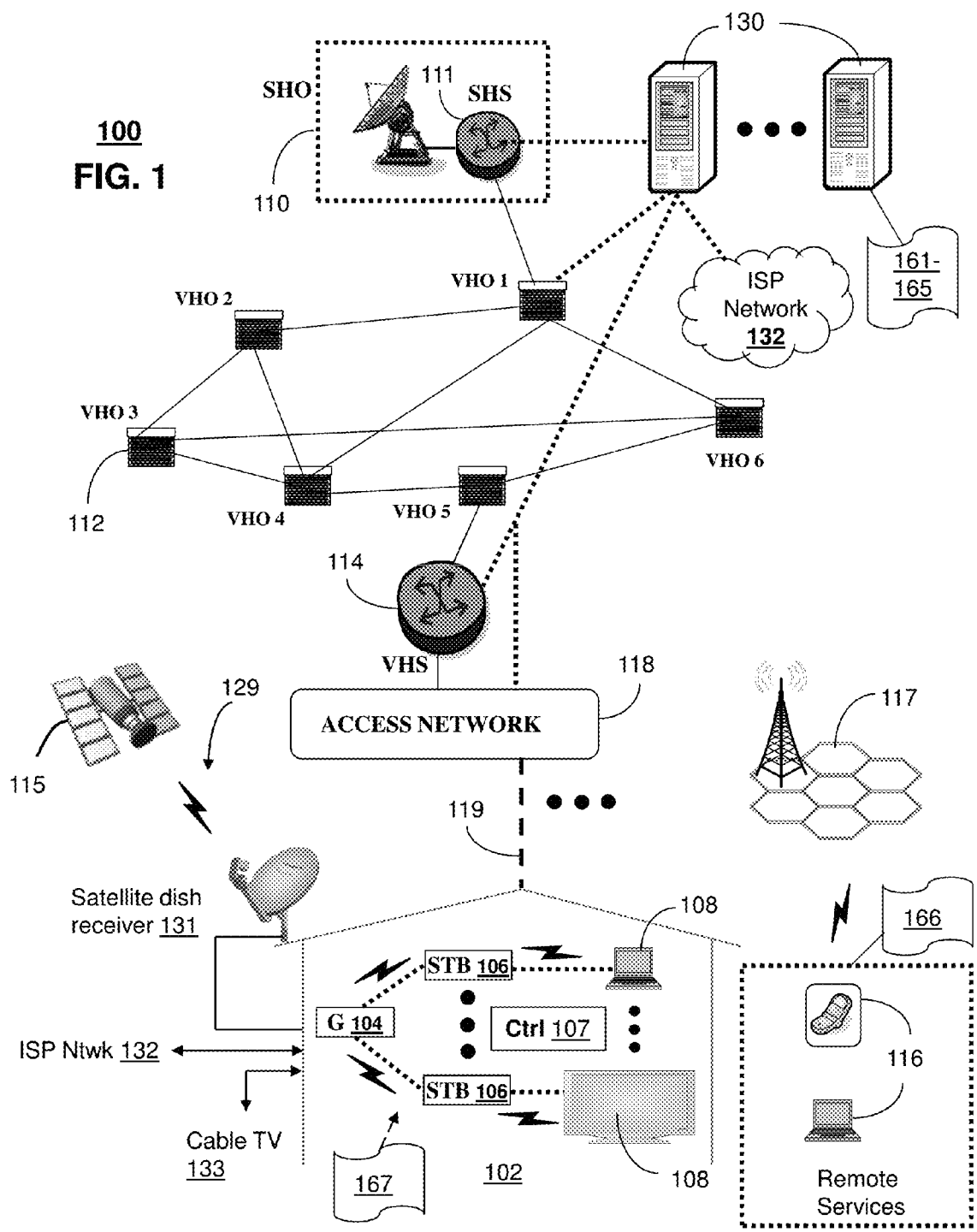
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media program from satellite and/or terrestrial communication systems. In the present context, media program can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the Internet Service Provider (ISP) network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an ISP network 132 to wireline media devices 108 or wireless communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a plurality of servers (herein referred to as servers 130). The plurality of servers 130 can use common computing and communication technology to operate as a Data Manager, a Data Mining Module, an Application Server, an EPG database, and a Speech Mashup Portal. Each of these servers 130 can perform functions 161-165, which includes among things, organizing micro-blogs according to their respective relevance to media programs supplied by communication system 100, mining the micro-blogs according to sentiment analysis, retrieving EPG data based on media program selections at the media processor 106, and speech to text conversion or translation based on speech detected by controller 107. The aforementioned functions 161-165 can interact with functions 166 and 167 operating in the remote devices 116, media processors 106, and controller 107.

Figure 2:
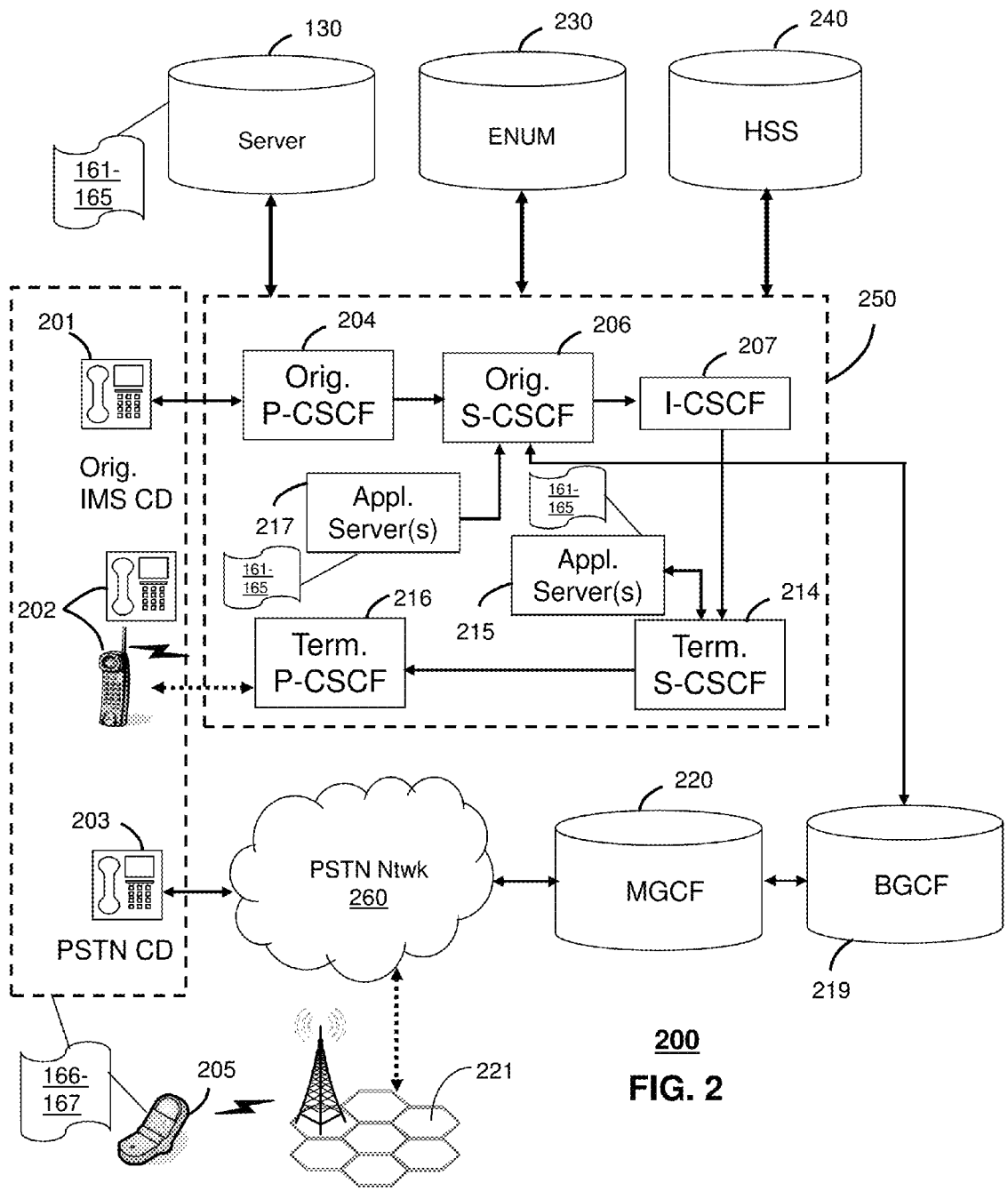

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (aSs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 to forward calls, *73 to cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances, the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is contemplated that cellular phones supporting LTE can support packet-switched voice and packet-switched data communications and thus may operate as IMS-compliant mobile devices. In this embodiment, the cellular base station 221 may communicate directly with the IMS network 250.

The servers 130 of FIG. 1 can also be operably coupled to the second communication system 200 for purposes similar to those described above. It is further contemplated by the present disclosure that servers 130 can perform function 161-165 and thereby provide the devices of FIG. 2 micro-blogs associated with media programs and trends derived therefrom which the devices can present according to functions 166 or 167. In another embodiment, the application servers 215 and 217 of FIG. 2 can be adapted to perform the functions 161-165 of servers 130.

Figure 3:
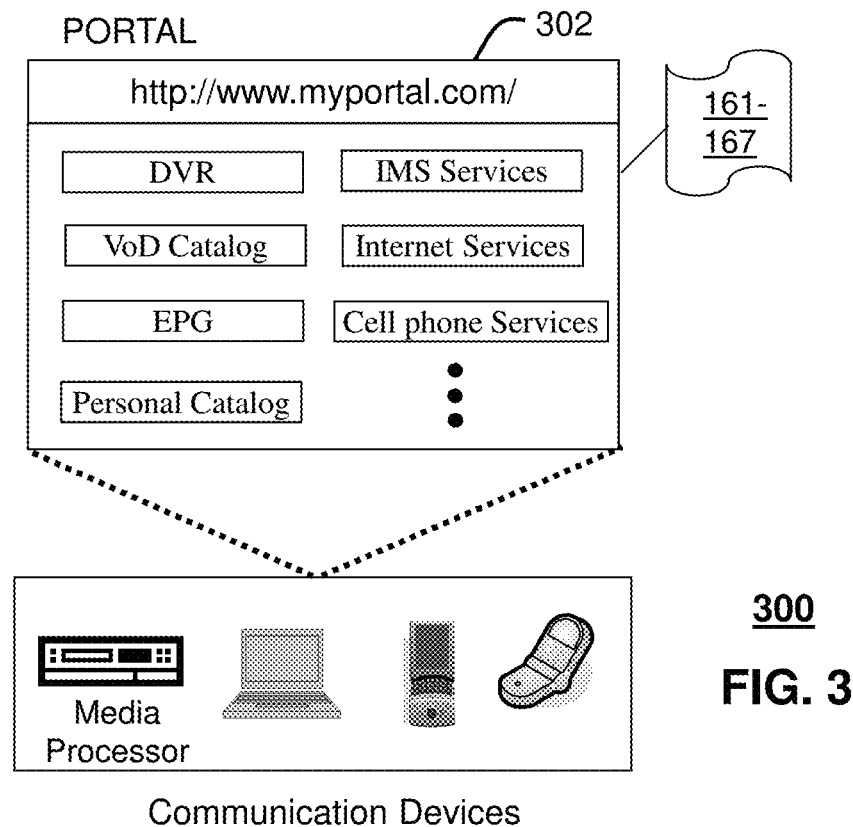
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 161-167 of servers 130, mobile devices 116, STBs 106, and IMS and PSTN devices 201-203 and 205, and/or server as a Speech Mashup Portal.

Figure 4:
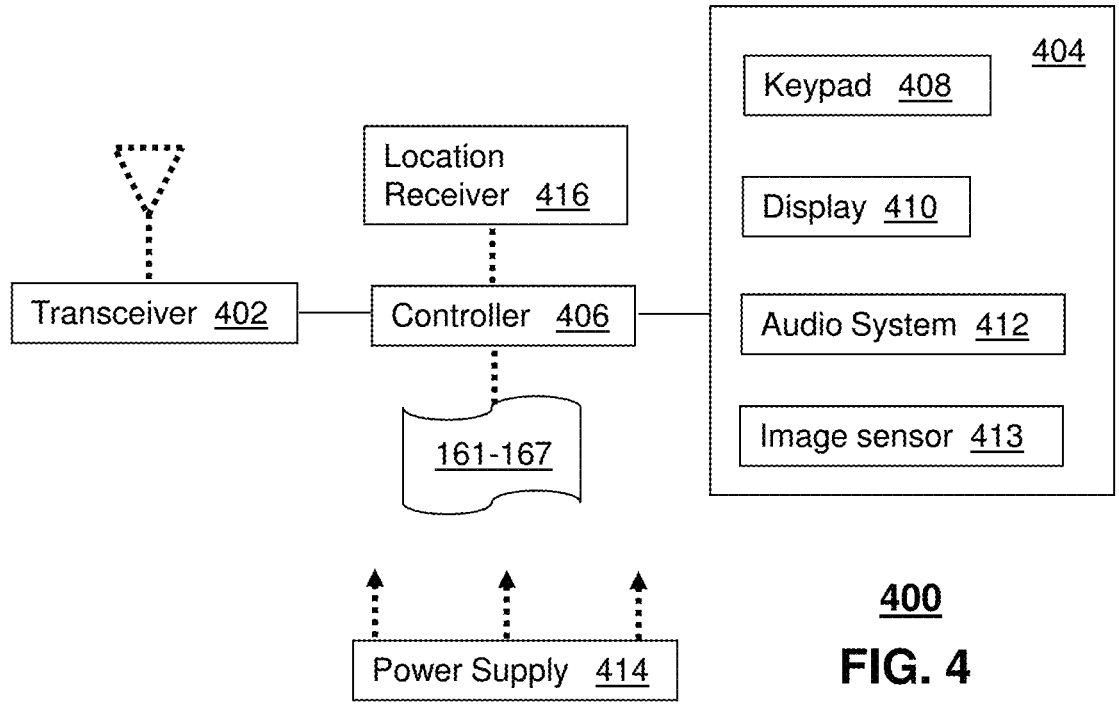
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TC/PIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203, 205 of FIG. 2. It will be appreciated that the communication device 400 can also represent other common devices that can operate in communication systems 100-200 of FIGS. 1-2 such as a gaming console and a media player.

It is further contemplated by the present disclosure that the communication device 400 can operate as servers 130, mobile devices 116, STBs 106, and IMS and PSTN devices 201-203 and 205 adapted to perform any one of functions 161-167, or combinations thereof.

Figure 5:
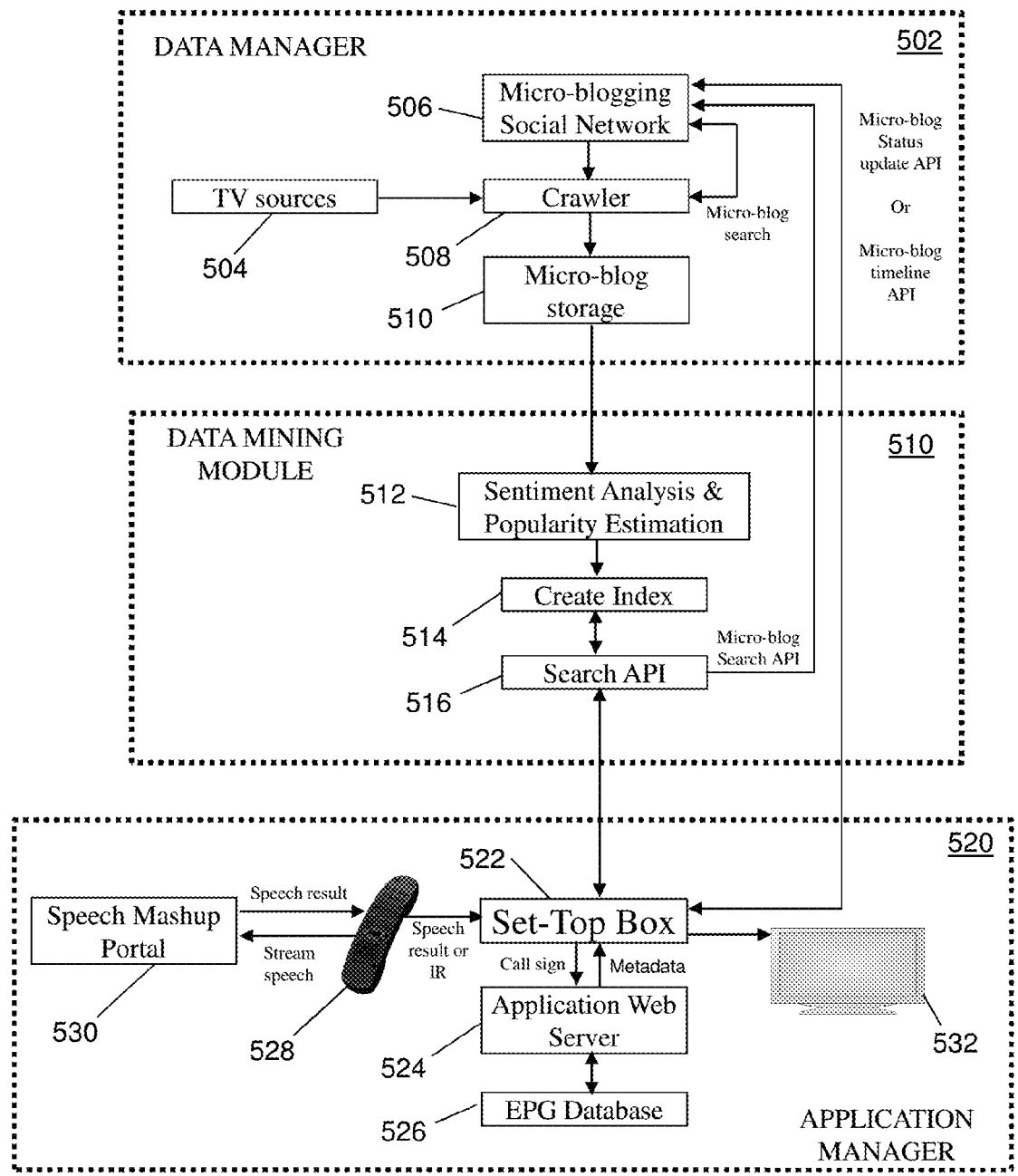
FIG. 5 depicts an illustrative embodiment of a system for processing micro-blogs.

FIG. 5 depicts illustrative embodiments of an architecture of a Voice-enabled Social TV (VoiSTV) system. VoiSTV has three functional blocks: Data Manager 502, Data Mining Module 520 and Application Manager 520. The Data Manager 502 can retrieve micro-blog messages relevant to TV shows (programs) and archive them. For illustration purposes only, micro-blog messages will be referred to herein as tweets—a term commonly used in social networks such as Twitter™. Micro-blogs (or Twitter™ data) can consist of a sequence of interlinked tweets associated with individuals each leading a micro-blog. The Data Mining Module 502 can be adapted to focus on mining archived data, estimating popularity, trends, and analyzing sentiment on tweets, among other things.

The archived data and metadata generated from the Data Mining Module 502 can be indexed. The created index can be used by the Application Manager 520 through search application programming interfaces (APIs). The Application Manager 520 can integrate archived Twitter™ data, Twitter™ stream data, and data generated from the Data Mining Module 502 into an interactive interface presentable by the STB 522 at a television 532. The Application Manager 520 can use Automatic Speech Recognition (ASR) technology to enable users to speak and post tweets. The Data Manager 502 and the Data Mining Module 510 can operate in a communication infrastructure independent of user interactions with the STB 522, whereas the Application Manager 520 handles real-time interactions of the user with the STB 522.

The Data Manager 502 can receive media program information from TV program sources 504 (such as IMDB-http://www.imdb.com, Freebase-http://www.freebase.com, Wikipedia-http://www.wikipedia.org, and EPG sources) and can retrieve relevant tweets from a micro-blogging social network 506 (such as Twitter™) for each TV show through Twitter™ APIs by issuing queries. The TV program sources 504 are effectively used to create additional queries in order to more accurately retrieve relevant tweets (such as queries for actors on a particular show in order to retrieve those tweets where only the actor names are mentioned and where the program title is not mentioned). A task of the Data Manager 502 is to collect tweets relevant to each TV program with a reasonable degree of precision.

The messages on Twitter™ are in the form of tweets, which are short status updates (of 140 characters or less). While the writing style and the lexicon of tweets are widely varied, many tweets are similar to short message service (SMS) text messages. Tweets are often highly ungrammatical, and filled with spelling errors. The 140 character limit also introduces shorthand notations and shortened URLs. There are a few special symbols allowed in tweets: hashtag (e.g., "#obama", a topic tag provided by the user), username (e.g., @twUser), shortened URLs (e.g., "http://bit.ly/9K4n9p"), and the retweet symbol "RT". It is estimated that 50 million tweets are generated per day.

There are a number of challenges in identifying tweets relevant to a given TV program. First, searching for tweets using only the TV program's title as the keyword phrase might find many tweets not relevant to the TV program. For instance, some TV programs have titles with generic terms such as "house" and "now". Using these keywords to search for relevant tweets can lead to a low precision result. Second, there is an expression gap between languages used in tweets and authorized resources such as TV program databases such as Internet Movie Database (IMDB), Freebase, Wikipedia, and others. Users on Twitter refer to a TV program in various ways such as using a program-related hashtag or a nickname of the actor. An additional challenge faced is a low recall. Ideally, the search retrieval results will have high precision and high recall. Precision is the fraction of the tweets that are classified as relevant to a specific TV program that are correct. High precision would mean you are less likely to incorrectly classify a tweet so the tweets should be relevant to the TV program. Recall is the fraction of the tweets that are relevant to a specific TV program that are successfully retrieved. For example, low recall is more severe for TV programs with long titles, which most users on Twitter do not use because of the 140 character limit. Another challenge is the shortness and informality of tweets, which poses challenges even with state-of-art text classification techniques due to a lack of information. This shortness of tweets coupled with spelling errors and non-grammatical writing styles make finding relevant tweets difficult.

The goal of the Crawler 508 is to collect relevant tweets. The present disclosure proposes a bootstrapping approach using machine learning as one possible embodiment to collect relevant tweets for a given TV program. Machine learning is a branch of artificial intelligence that allows computers to detect behaviors based on empirical data. An approach proposed in this disclosure begins with a small set of annotated data, where for a given TV program and a candidate tweet, the TV program and the candidate tweet are annotated to be relevant or irrelevant. From this annotated data set, an initial classifier is trained. The classifier features are designed to capture an association between the TV program and the tweet. For instance, one classifier feature could "learn" that messages which mention the names of some actors that play in the current show are likely relevant to that show. Second, using the initial classifier and a large dataset of unlabeled messages, broader features are derived for a second classifier to further improve the precision of detecting relevant tweets for a specific TV program. Additionally, some of the obtained features are also used to improve the recall of the system. Nine features were used for the initial classifier, which enabled detection of a tweet containing TV related terms such as an episode, if the show title mentioned in the tweet was capitalized, as well as the text relevancy between the tweet and, for example, a Wikipedia page of the corresponding TV program. The second classifier extends the first one with five additional features derived by running the first classifier on a large corpus of unlabeled tweets.

A sample of 3,000 tweets was annotated, which were randomly chosen from a tweet collection obtained using three TV program titles (Fringe, Monk, Heroes) as the queries. These tweets along with their associated TV program titles were provided to an Amazon Mechanical Turk for annotation. The Amazon Mechanical Turk is a tool that enables computer programmers (known as Requesters) to co-ordinate the use of human intelligence to perform tasks that computers are unable to perform at the present time. After filtering, 2,629 annotated tweets were retained. The classifiers were trained on tweets associated with two of the three TV programs and tested on the remaining TV program. The precision of tweets classified as relevant were averaged over the three possible combinations of TV programs. The term precision in the present context is defined to mean a percentage of tweets classified as relevant that are annotated as relevant. The foregoing experimentation achieved 80.1% precision for the first classifier and 84.3% for the second classifier.

The Data Mining Module 510 indexes the collected tweets considered to be relevant, analyzes them, and supports various types of searches. The Data Mining Module 510 provides aggregated statistics such as sentiment analysis, TV show popularity, word clouds, trending topics, and popular messages for each TV program. These statistics can be presented in a TV application page hosted by the Application Manager 520 via Application Web Server 524 operating therein and downloaded to the STB 522.

A search platform such as SOLR (open source enterprise search platform from the Apache Lucene project) was used to index the tweets. Along with standard metadata such as author, date, and text, certain information was stored such as information on sentiment analysis, the identification of the TV programs mentioned in the tweet, and a normalized version of the text used for determining popular tweets, as explained below. A Search API can be used to query SOLR and return information to the STB 522. For instance, a SOLR query can return relevant tweets for a given TV program, rankings of tweets based on recency, number of tweets about a particular TV program for a given time window, tweets with positive and negative sentiment, and/or a word cloud derived from the archived tweets for a given TV program.

Sentiment Analysis: Each relevant tweet was classified into one of three sentiment categories: Neutral, Positive, and Negative based on an approach described by L. Barbosa and J. Feng, "Robust sentiment detection on Twitter from biased and noisy data," in Proceedings of the $23^{rd}$ International Conference on Computational Linguistics (COLING), 2010, all relevant portions of which are incorporated herein by reference. A two-step sentiment analysis method was used with noisy training data. Tweets were classified as subjective (polar) and objective (non-polar). Polar tweets were distinguished as positive or negative. Training data was collected from three popular Twitter™ sentiment detection Web sites (http://twendz.waggeneredstrom.com, http://twittersentiment.appspot.com, http://www.tweetfeel.com). The method used in the present disclosure achieved 81.9% accuracy for subjectivity detection and 81.3% for polarity detection (positive vs. negative).

Popular Messages: Popularity was defined to be a frequency of repetition of content of a tweet (e.g., multiple retweets of the same tweet). For each tweet, a normalized version was generated by removing the word "RT", removing mention of usernames (@user), and changing text to lowercase. An MD5 hash (Message-Digest Algorithm 5 widely used cryptographic hash function) of the normalized version was then generated and stored along with the actual tweet text. This technique is described in Dobbertin, Hans, "The Status of MD5 After a Recent Attack". CryptoBytes 2 (2), 1996, all relevant portions of which are incorporated herein by reference. Two messages with the same content correspond to the same hash. SOLR can be used with this technique to return popular messages in a certain time frame. For a given TV program, SOLR can also rank tweets in descending order based on the frequency of the hash.

The Application Manager 520 can manage real-time interactions of the user with system 500. The Application Manager 520 can be adapted, for example, to accept input from a voice-enabled remote controller 528. Speech input from the remote controller 528 can be converted into text using the Speech Mashup Portal 530, (see G. DiFabbrizio, T. Okken, and J. Wilpon, "A Speech Mashup, Framework for Multimodal Mobile Services," *ICMI-MLMI* 2009, Cambridge, Mass., pp. 1-10, November 2009, all relevant portions of which are incorporated herein by reference).

Traditionally, a remote controller is used for changing channels and navigating TV menus. In system 500, users can navigate TV menus, speak tweets by pressing a TALK button on the voice-enabled remote controller 528, visualize the speech recognition output on the TV 532, send tweets, reply to tweets, and retweet tweets.

Each time the user switches channels, the STB 522 fetches the TV program information from the EPG database 526, which contains schedule and show information for the upcoming days, and uses the TV program name to retrieve tweets relevant to the current show through the Search APIs in the Data Mining Module 510. The STB 522 displays the TV program (in high definition video) and the relevant tweets on the same screen by way of a graphical user interface—see FIGS. 6-8. In place of or in combination with tweets relevant to the current TV program, the STB 522 can also show the users' personal tweets on the same screen as the TV program. The STB 522 can also display metadata information of TV programs provided by the Data Mining Module 510.

Speech Mashup Portal: The voice-enabled remote controller 528 can stream the user's speech to the Speech Mashup Portal 530 which provides a speech recognition result. The underlying speech recognition engine used in the present disclosure was the AT&T Watson (see V. Goffin, C. Allauzen, E. Bocchieri, D. Hakkani-Tür, A. Ljolje, S. Parthasarathy, M. Rahim, G. Riccardi, and M. Saraclar, "The AT&T WATSON speech recognizer," IEEE International Conference on Acoustics, Speech and Signal Processing, 2005, all relevant portions of which are incorporated herein by reference). The acoustic and language models of Watson were trained using SMS messages. The STB 522 was adapted to display the recognition result to allow the user to confirm it before posting the tweet using a Twitter™ status update API.

The role of the Application Web Server 524 was to host an application web page that operated from the STB 522. The capabilities described above relating to the STB 522 were largely possible because of the Application Web Server 524. The Application Web Server 524 also ran a web service to handle database requests to the EPG database for retrieving metadata for a given TV channel such as the TV title.

Figure 6:
FIGS. 6-8 depict illustrative embodiments for presenting graphical user interfaces by way of a media processor.

FIG. 6 depicts an illustrative embodiment of a TV program presented concurrently with a graphical user interface (GUI) depicting aspects of micro-blogs from Twitter™ determined to be relevant to the TV program being presented as described above. The main menu options shown in FIG. 6 include Program Tweets, My Tweets, Program Trends, General Trends, and Send Tweets. The menu options are shown on the left and can be navigated using the up and down arrows of the remote controller 528. Each menu option except the Send Tweets option can have more levels of options which can be presented responsive to selecting an OK button on the remote controller 528. A context window is positioned to the right of the menu options. At a top menu level, the context window is the TV program being watched. As a user uses the arrow keys to move up or down between menus, the bottom bar updates with relevant information associated with the highlighted menu.

The Program Tweets menu option provides a presentation of tweets relevant to the current TV program as shown at the bottom bar of FIG. 6. In the present illustration only one tweet is shown at a time. The user can navigate between tweets with the right and left arrows surrounding the tweet being displayed. The left most tweet can be the most recent tweet and the tweets can be numbered so a user can keep track of which tweet is being displayed. As new tweets arrive for the current program being watched, the numbering can be updated appropriately while keeping the currently viewed tweet in the bottom bar. For example, if the user is viewing tweet 1 of 20 and a new tweet arrives, the numbering changes to 2 of 21 so that it is evident to the user that a new tweet has arrived and can be viewed by moving to the left using the left arrow key. If the user changes the channel, the video portion of the display is changed to a new TV program presented on the selected channel and the tweets in the bottom bar are replaced with tweets relevant to the new TV program. If the user presses the OK button, more options will be shown for the Program Tweets selection.

Figure 7:

For the Send Tweets menu options, the bottom bar shows instructions on how to create a tweet using speech as depicted in FIG. 7. The instructions indicate that a user can press the TALK button on the remote controller 528 to verbalize a tweet, which can be sent once the OK button is depressed on the remote controller 528. The speech result can appear in the bottom bar moments after speaking into the remote 528 so the user has the option of confirming the speech result before depressing the OK button to send the tweet reply. If the speech to text translation is inaccurate, the user can restart the aforementioned process with the remote controller 528 which overwrites the last result.

Figure 8:
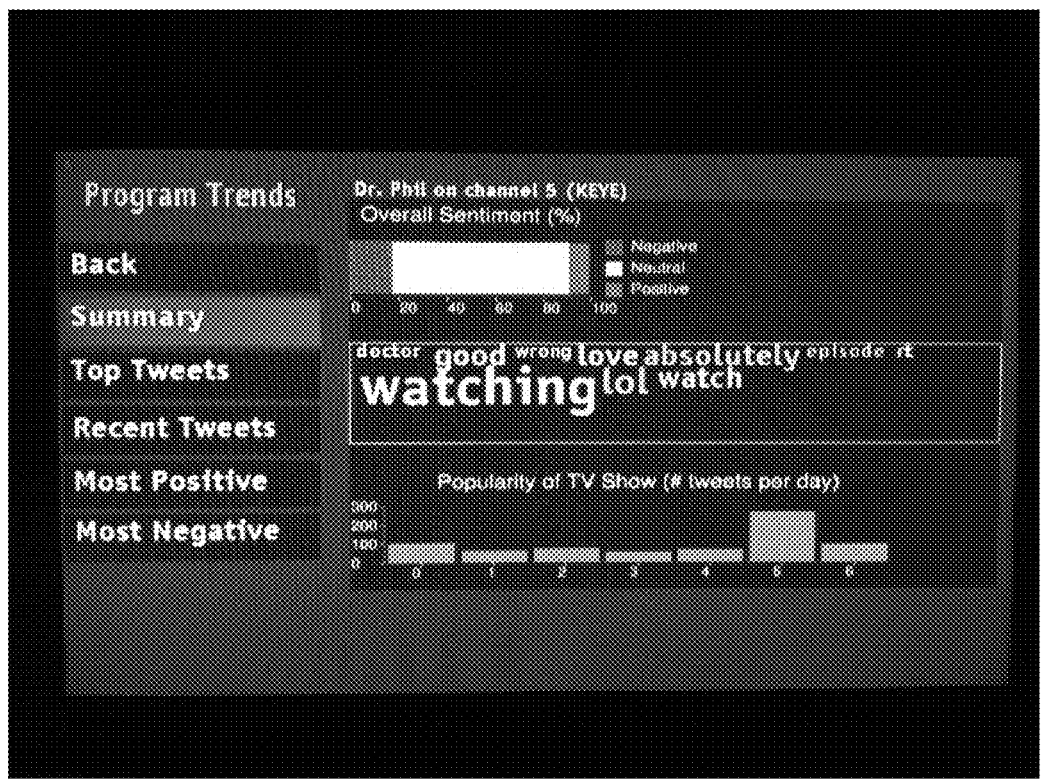

The Program Trends menu gives the user access to much more information that is generated by the Data Mining Module 510. For example, the Summary option for Program Trends as shown in FIG. 8 provides a chart showing the results of sentiment analysis (negative, neutral, and positive), a word cloud containing words that occur most frequently in tweets about the current TV program, and a popularity chart that shows the number of tweets in the last week relating to the current TV program. The Top Tweets menu option can show tweets related to the current TV program that are retweeted most frequently. Recent tweets can refer to the same tweets that were shown in the top-level Program Trends menu option. The Most Positive and Most Negative menu options can represent the most positive and negative tweets about the TV program determined by the sentiment analysis element 512 of the Data Mining Module 510.

Figure 9:
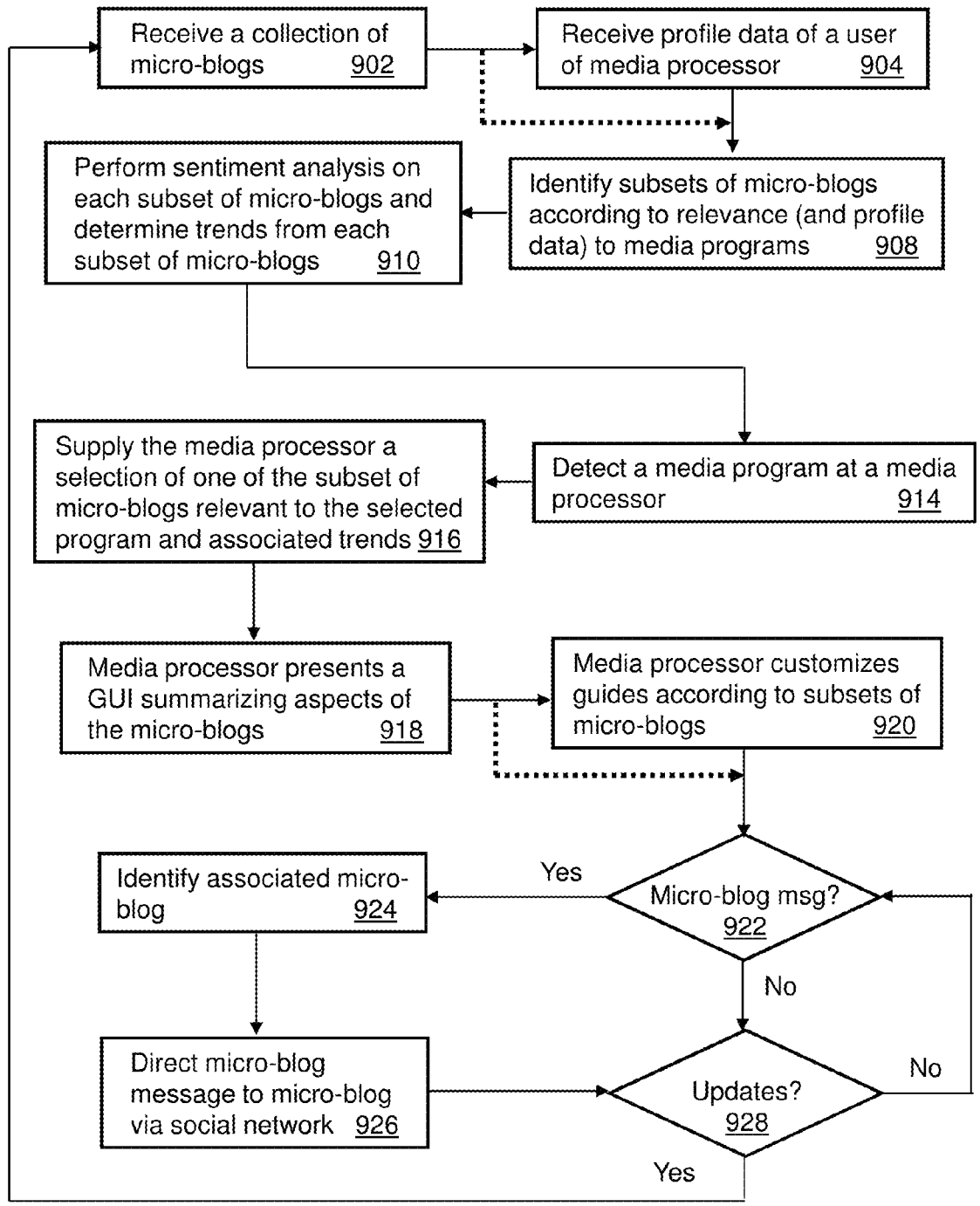
FIG. 9 depicts an illustrative embodiment of a method operating in portions of the systems described in FIGS. 1-5.

FIG. 9 depicts an illustrative method 900 that can operate in portions of the devices of FIGS. 1-5. Method 900 can begin with step 902 in which the Data Manager 502 receives a collection of micro-blogs. The micro-blogs can be supplied by a social network such as Twitter™ as described earlier. In step 904, the Data Manager 502 can also be adapted to receive profile data associated with a user of a media processor. The media processor in this illustration can refer to the STB 522 of FIG. 5. Other media processors such as a smart phone, computer, media player, are contemplated by the present disclosure. The profile data can represent demographic and/or psychographic data that can be used to describe a user's background (age, gender, income, ethnicity, etc.) as well as likes, dislikes, biases or other behavioral features which can be used to characterize the user. If profile data is not available, then step 904 can be skipped. In step 908, the Data Manager 502 can identify subsets of micro-blogs from the collection of micro-blogs received in step 902 according to a relevance of each micro-blog to the media programs supplied to the STB 522. In step 908, the Data Manager 502 can further use, if available, the profile data of the user to further analyze microblogs for relevance to the interests of the user of the STB 522.

In step 910, the Data Mining Module 510 can perform sentiment analysis on each subset of micro-blogs to determine favorable, unfavorable, and neutral micro-blogs for each media program. The Data Mining Module 510 can further determine in step 910 trends via pattern recognition or other techniques for each subset of micro-blogs. Trends can be used to rank media programs, identify media programs that may be of high interest to a user, identify top topics for each media program, and identify media programs that are falling in popularity, media programs that are rising in popularity, and so on. In step 914, the TV application page hosted by the Application Manager 520 or the Application Web Server 524 can operate from a STB 522 and thereby detect a media program request responsive to a user's selection of a channel by way of the remote controller 528 of FIG. 5. At step 916, the Application Manager 520 can request from the Data Mining Module 510 a subset of the micro-blogs that are relevant to the requested media program and supply this subset to the STB 522 along with associated trend information.

In step 918, the STB 522 can be adapted to present a GUI concurrent with the selected media program which presents aspects of the received subset of micro-blogs—see FIGS. 6-8. In an embodiment where profile data of a user was used by the Data Manager 502 to detect relevant micro-blogs for the selected media program, the STB 522 can be further adapted to customize guides such as the EPG or video on demand (VoD) guides according to the subset of micro-blogs supplied by the Data Mining Module 510. The EPG can be customized, for example, with the most frequently tweeted media programs, with suggestions for recording such programs, and with links to the most popular tweets for each program. Similarly, the VoD can be customized to present the most frequently discussed movies with links to associated popular tweets. Other suitable forms of customization are contemplated by the present disclosure. If customization is not desired by the user, step 920 can be skipped.

In step 922, the STB 522 can be adapted to receive tweets generated by the user of the STB 522 upon, for example, depressing the talk button on the remote controller 528, speaking the tweet, and then depressing the OK button to submit the tweet. There may be other ways for the STB 522 to receive the tweet such as by way of a wired or wireless microphone of the STB 522 itself or from the Speech Mashup Portal 530 or from a remote server in communication with the Speech Mashup Portal 530. The STB 522 can also be adapted to receive tweets generated by a mobile device using the microphone on the mobile device for speech input. If a microblog message request is detected, the Application Manager 520 can determine in step 924 in coordination with the Data Manager 502, which micro-blog leader (micro-blogger) would be associated with the micro-blog (tweet) message generated by the user. Once such as determination is made, the micro-blog (tweet) message can be directed in step 926 by the Application Manager 520 or the Data Manager 502 to the identified micro-blogger by way of the social network. In another embodiment, the micro-blog (tweet) message can be directed to more than one social network.

If, on the other hand, a micro-blog message request is not detected in step 922, the Data Manager 502 can determine whether new tweets have arrived. If there are new tweets, steps 902 through 912 can be performed and the Application Manager 520 by way of the STB 522 or the Application Web Server 524 operating therein can be notified of these updates, which the STB 522 can then present in the GUI of FIGS. 6-8.

In step 928, updates to the micro-blogs can be directed by the social network to the Data Manager 502 autonomously or responsive to the Data Manager 502 polling the social network for updates. When micro-blog updates are received, portions of method 900 as described above can be applied to these updates so that the STB 522 can be supplied an updated subset of micro-blogs.

Upon reviewing the aforementioned embodiments, it would be evident to an artisan with ordinary skill in the art that said embodiments can be modified, reduced, or enhanced without departing from the scope and spirit of the claims described below. For example, method 900 can be adapted for any type of media program (e.g., TV shows, eBooks, on-line radio, on-demand video rentals, etc.). Media programs are thus contemplated broadly to mean any form of consumable content. Method 900 can be adapted for portable devices such as smart phones, cellular phones, tablets, laptops, and so on. Method 900 can also be adapted to any form of blogging information not just micro-blog messages such as Twitter™ messages. For example, method 900 can be applied to blogging information from social networks such as Facebook™. Method 900 can also be adapted so that text messages can also be generated at the STB 522 as micro-blog messages generated with the assistance of a remote controller 528 or a mobile device having a QWERTY keyboard or other suitable means. Additionally, method 900 can be adapted for landline devices such as those described in FIG. 2. Portions of method 900 can be integrated in a single device such as the STB 522 without requiring assistance from network elements of communication systems 100-500. Other embodiments are contemplated by the present disclosure.

Figure 10:
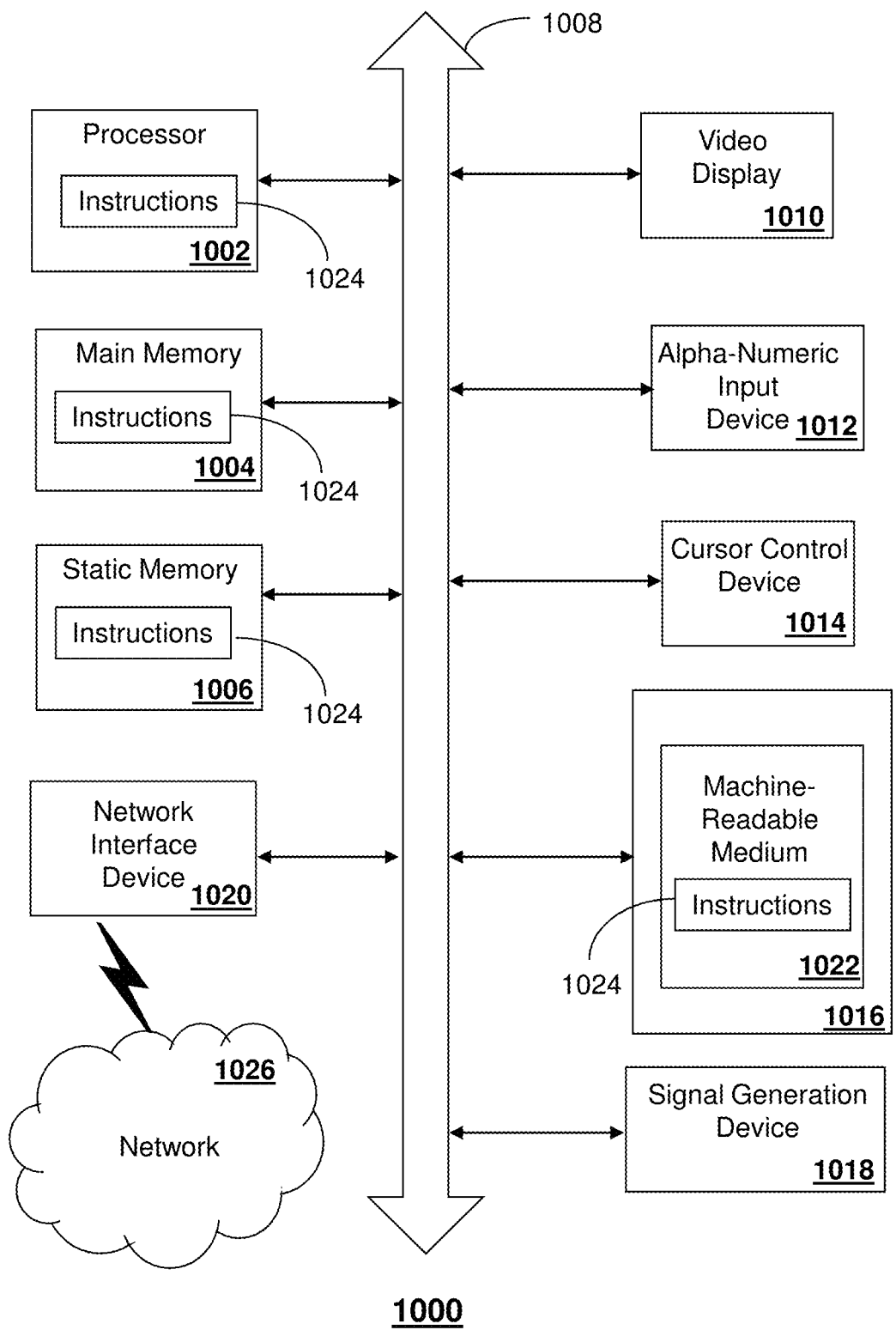
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods discussed above. One or more instances of the machine can operate, for example, as the servers 130, the Data Manager 502, the Data Mining Module 510, the Application Manager 520, and any of the devices of FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a memory to store instructions; and
a processor coupled to the memory, wherein execution of the instructions causes the processor to perform operations comprising:
    receiving a collection of micro-blogs;
    detecting a set-top box from a plurality of set-top boxes requesting a television program as a requested television program from a plurality of television programs;
    identifying subsets of micro-blogs that are relevant to the requested television program, wherein the identifying comprises:
        obtaining an initial set of annotated micro-blogs, wherein the initial set of annotated micro-blogs are annotated as being either relevant to the requested television program or not relevant to the requested television program;
        training a first classifier based on the initial set of micro-blogs to generate a trained first classifier;
        applying the trained first classifier to unannotated micro-blogs from the collection of micro-blogs to generate a first set of features associating the requested television program with the unannotated micro-blogs to train a second classifier;
        training the second classifier according to the features generated by the trained first classifier to generate a trained second classifier;
        applying the trained second classifier to the collection of micro-blogs to identify subsets of micro-blogs relevant to the requested television program as a subset of relevant micro-blogs;
    performing a sentiment analysis on the subset of relevant micro-blogs to determine a trend related to the requested television program;
    supplying to the set-top box the subset of relevant micro-blogs for concurrent presentation with the requested television program and a graphical user interface that presents a portion of a selected subset of micro-blogs according to the trend;
    selecting scheduled media programming according to the subset of micro-blogs;
    supplying to the set-top box an electronic programming guide listing the scheduled media programming selected according to the subset of micro-blogs;
    selecting media program rentals according to the subset of micro-blogs;
    supplying to the set-top box a video on demand guide listing the media program rentals selected according to the subset of micro-blogs;
    receiving a micro-blog message from the set top box;
    identifying a micro-blog leader associated with the micro-blog message; and
    directing the micro-blog message to a micro-blog group of the micro-blog leader.

2. The device of claim 1, wherein the detecting comprises detecting the set-top box requesting the television program responsive to receiving a notice from the set-top box or monitoring the set-top box, and wherein the sentimental analysis determines the trend from one of micro-blog trends favorable to the television program, micro-blog trends unfavorable to the television program, micro-blog topical trends, micro-blog popularity trends, or any combination thereof.

3. The device of claim 2, wherein the operations further comprise:
    subdividing the subset of relevant micro-blogs into micro-blog subgroups comprising one of micro-blogs favorable to the television program or micro-blogs unfavorable to the television program; and
    supplying to the set-top box the micro-blog subgroups for presentation at the graphical user interface.

4. The device of claim 2, wherein the set-top box further customizes the electronic program guide or the video on demand guide according to the trend related to the requested television program.

5. The device of claim 1, wherein the operations further comprise:
    receiving demographic information or psychographic information associated with the user of the set-top box; and
    identifying from the subset of relevant micro-blogs subsets of micro-blogs according to one of the relevance of the subset to the plurality of television programs, the demographic information, or the psychographic information.

6. The device of claim 1, wherein each micro-blog in the collection of micro-blogs comprises text content, audio content, image content, video content, or portions thereof, and wherein each micro-blog is associated with a leader controlling the micro-blog and followers participating in the micro-blog.

7. The device of claim 1, wherein the device operates as a network element of an interactive television network, a cable television network, a satellite television network, an Internet Protocol multimedia subsystem network, or a portal.

8. A media processor, comprising:
a memory to store instructions; and
a processor coupled to the memory, wherein execution of the instructions causes the processor to perform operations comprising:
    receiving a selection to present a media program as a selected media program;
    submitting to a device a request for a subset of micro-blogs from a collection of micro-blogs that are relevant to the selected media program, wherein the device identifies the subset of micro-blogs by performing operations comprising:
        obtaining an initial set of annotated micro-blogs, wherein the initial set of annotated micro-blogs are annotated as being either relevant to the selected media program or not relevant to the selected media program;

training a first classifier based on the initial set of micro-blogs to generate a trained first classifier;

applying the trained first classifier to unannotated micro-blogs from the collection of micro-blogs to generate a first set of features associating the selected media program with the unannotated micro-blogs to train a second classifier;

training the second classifier according to the features generated by the trained first classifier to generate a trained second classifier;

applying the trained second classifier to the collection of micro-blogs to identify subsets of micro-blogs relevant to the selected media program as selected micro-blogs;

performing a sentiment analysis on the selected micro-blogs to determine a trend related to the selected media program;

receiving from the device the subset of micro-blogs and the trend;

concurrently presenting a graphical user interface that presents the selected micro-blogs, the trend, and the selected media program;

receiving an electronic programming guide listing scheduled media programming selected according to the subset of micro-blogs;

receiving a video on demand guide listing media program rentals selected according to the subset of micro-blogs;

receiving a micro-blog message;

identifying a micro-blog leader associated with the micro-blog message; and directing the micro-blog message to a micro-blog group of the micro-blog leader.

9. The media processor of claim 8, wherein the operations further comprise submitting to the device a notice of the selected media program, or receiving a status request from the device prompting the processor to submit the notice to the device.

10. The media processor of claim 8, wherein the operations further comprise:

identifying metadata of the selected media program; and selecting a relevant subset of micro-blogs from the selected micro-blogs according to an association between the metadata and the selected micro-blogs.

11. The media processor of claim 8, wherein the operations further comprise:

receiving a micro-blog message; and submitting the micro-blog message for posting in a micro-blog of social networks.

12. The media processor of claim 11, wherein the micro-blog message is a speech message that has been transcribed to text by a speech server.

13. A method, comprising:

detecting, by a system comprising a processor, a subscriber device from a plurality of subscriber devices that is selecting a media program from a plurality of media programs as a selected media program;

identifying, by the system, subsets of blogs from a collection of blogs according to a relevance of each subset of blogs to the selected media program, wherein the identifying comprises:

obtaining, by the system, an initial set of annotated blogs, wherein the initial set of annotated blogs are annotated as being either relevant to the selected media program or not relevant to the selected media program;

training, by the system, a first classifier based on the initial set of blogs to generate a trained first classifier;

applying, by the system, the trained first classifier to unannotated blogs from the collection of blogs to generate a first set of features associating the selected media program with the unannotated blogs to train a second classifier;

training, by the system, the second classifier according to the features generated by the trained first classifier to generate a trained second classifier;

applying, by the system, the trained second classifier to the collection of blogs to identify subsets of blogs relevant to the selected media program as selected blogs;

performing, by the system, a sentiment analysis on the subset of blogs to determine a trend related to the selected media program;

supplying, by the system, the subscriber device with the selected blogs for concurrent presentation with the selected media program and a graphical user interface that presents the subset of blogs according to the trend;

selecting, by the system, scheduled media programming according to the subset of blogs;

supplying, by the system, an electronic programming guide listing the scheduled media programming selected according to the subset of blogs;

selecting, by the system, media program rentals according to the subset of blogs;

supplying, by the system, a video on demand guide listing the media program rentals selected according to the subset of blogs;

receiving, by the system, a blog message;

identifying, by the system, a blog leader associated with the blog message; and directing, by the system, the blog message to a blog group of the blog leader.

14. The method of claim 13, wherein the detecting comprises receiving from the subscriber device a notice of the selected media program, or transmitting a status request to the subscriber device prompting the subscriber device to submit the notice.

15. The method of claim 13, wherein the sentimental analysis determines the trend according to one of blog trends favorable to each media program, micro-blog trends unfavorable to each media program, micro-blog trends neutral to each media program, micro-blog topical trends, micro-blog popularity trends, or any combination thereof.

* * * * *